Feb. 26, 1963 R. W. CHREST ETAL 3,079,269
INORGANIC BLUE TO GREEN PIGMENTS
AND PROCESSES FOR MAKING SAME
Filed April 11, 1960 4 Sheets-Sheet 3

3,079,269
INORGANIC BLUE TO GREEN PIGMENTS AND
PROCESSES FOR MAKING SAME
Roy W. Chrest and Frank O. Rummery, Baltimore, J. Dudley Richards, Lutherville, and Reuben Roseman, Baltimore, Md., assignors to The Glidden Company, Cleveland, Ohio, a corporation of Ohio
Filed Apr. 11, 1960, Ser. No. 21,197
12 Claims. (Cl. 106—300)

The instant invention relates to improved blue-to-green inorganic pigments, and more particularly to such pigments containing a significant fraction of free titania preponderantly in the rutile crystalline form and coalesced with other inorganic ingredients.

Heretofore, inorganic blue-to-green pigments have been compounded by physically mixing pigmentary titania with cobalt aluminate (e.g., Thenard's blue) or cobalt metatitanate (a green pigment as shown, for example in U.S. Patent 1,969,061) in a paint vehicle. Both such pigments tend to "float," i.e., separate in paint vehicle mixtures on standing or after application of the paint to a surface and to give highly undesirable effects, and ours do not. Furthermore, the cobalt aluminate has a refractive index close to that of linseed oil and is, therefore, nearly transparent when ground in that medium.

Additionally, our pigments give stronger blue and green color development than their corresponding physically mixed pigments for a given cobalt content; the colorant is thoroughly predispersed in our pigments; any chalking which may occur leaves a uniform coloring rather than a white residue; our pigments are easier to grind and disperse in paint vehicles than are the corresponding physically mixed pigments; and our pigments are readily dispersed in plastics such as acrylic resins, and resins for synthetic fiber use, to give attractive colors and high opacity. They are also useful for tinting paper.

Heretofore, aluminum nitrate, titania, and cobaltous sulfate heptahydrate have been heated together to about 1000° C. in approximately stoichiometric quantities to make an intimate mixture of cobalt aluminate and cobalt titanate with no, or only minute quantities of, free titania (Example 7 of British Patent 384,473 of 1932). The bluish-green pigment resulting would, of course, require additional physically mixed titania to approximate our pigments, and accordingly have the same deficiencies as pointed out for the physically mixed pigments, above. It also can be observed that at such early date only anatase titania pigments were generally available, and pigments compounded with anatase titania would suffer in chalk resistance and opacifying power when compared with those containing rutile titania. The same observation can be made with respect to Swiss Patent 163,196, which appears to admit to greater latitude in the proportions of combining reactants.

U.S. Reissue 21,427 shows the production of gray-ivory pigments from the coalescence of about 6 weight percent cobaltous oxide with titania, and it teaches that products with more cobalt oxide than this have a dirty, unsightly appearance. Our alumina-free pigments, which are richer in cobalt than this, are manifestly different in that they provide good green colors; and, when more or less cobalt is used in conjunction with some alumina in our pigments, good bluish-green, greenish-blue, and blue colored pigments are formed.

As completely inorganic pigments, ours offer high chemical and heat stability which includes the following benefits: high alkali resistance, of value for example in emulsion paints intended for use on alkali-containing masonry surfaces; high acid resistance, for example in polyvinyl acetate paints; high heat resistance, of value for example in baking enamels and plastics; high fade resistance, of value for example in automobile finishes; freedom from bleeding; and lack of toxicity. They are particularly suited for use in chemically reactive plastics and in plastics where relatively high temperatures are used in molding. This union of properties is not possessed by conventional blue and green pigments such as phalocyanine blues and greens, milori (iron) blue, ultramarine blues, indanthrene blues, and chrome greens.

Because our pigments are coalesced, they offer the highest possible degree of dispersion and the advantages associated therewith. Because the uncombined titania fraction of our pigments is preponderantly rutile, i.e., at least about 80%, advantageously at least about 90%, and preferably at least about 95%, they have outstanding stability against weathering and chalking. Also, by their use, streaking or blotching of the surface from uneven chalking is prevented or minimized, because the pigment remaining in the intact film is the same color as the chalk.

For brevity, we refer to our pigments as oxidic ones because their composition can be expressed conventionally and empirically in terms of the metal oxides (which are free and combined) to make the fundamental coalesced pigment and are, therefore, to be distinguished from sulfidic, organo-metal compounds, etc. of the various essential metal components.

Figure 1:
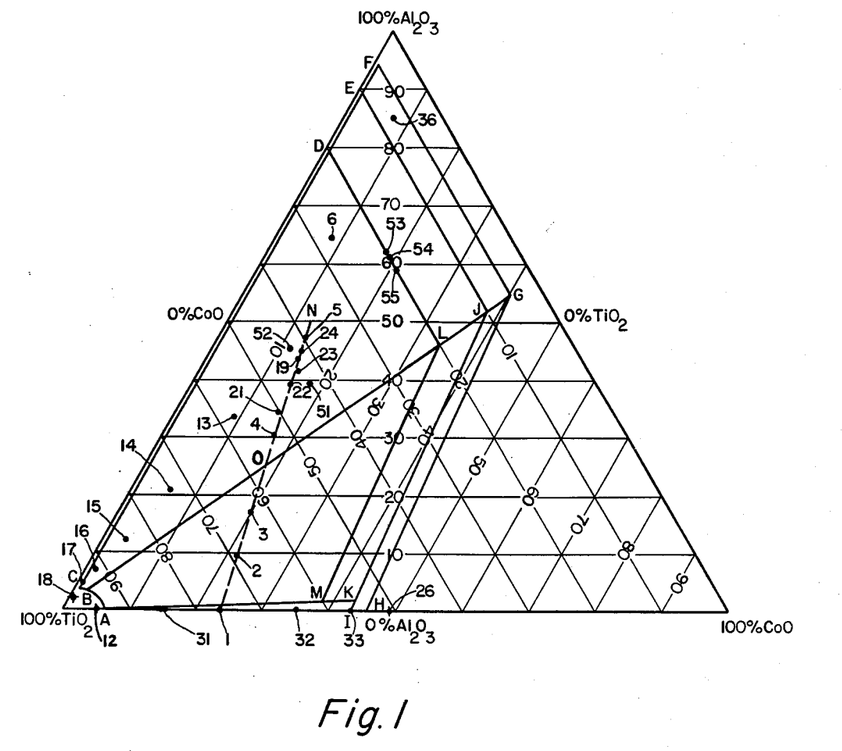

Broadly, our oxidic blue-to-green pigments consist essentially of the coalesced, calcined composites of about 5 to 96.6% free and uncombined titanium expressed as titania, said free titania being preponderantly rutile titania and comprising at least about 5% of said composites, about 0.9 to 46% of cobaltous cobalt expressed as cobaltous oxide, and about 0 to 94.1% of aluminum expressed as alumina, there being virtually no titanium in said composites combined with aluminum, the proportions of the total titanium to cobalt to aluminum in said composites, expressed as said oxides, being defined by polygon ACFGH of FIGURE 1. All titania-cobaltous oxide-alumina compositions called for and shown herein are expressed exclusively of any titania conditioning agent, discussed hereinafter.

Our process for manufacturing said pigments comprises compounding an intimate mixture of cobaltous oxide-providing material, rutile titania-providing material, and alumina-providing material in a proportion of titanium to cobalt to aluminum, expressed as said oxides, defined by polygon ACFGH of FIGURE 1, and calcining said mixture at a temperature between about 700° and about 1100° C.

Referring to the drawings, FIGURE 1 is a triangular coordinate diagram showing the composition of our various coalesced pigments expressed in terms of the oxides. Our pigments lie within the polygons outlined. Several species of our pigments having special usefulness and preferred composition lie within the smaller polygons encompassed by polygon ACFGH. Certain specific of our compositions referred to in the examples hereinafter are plotted within the polygons as black dots, and certain compositions prepared for comparative purposes and indicated in the examples, but lying without polygon ACFGH, are plotted as small $x$'s.

The apex of the diagram represents 100% alumina, and the base 0% alumina. The righthand corner of the diagram represents 100% cobaltous oxide, and the lefthand side opposite thereto 0% cobaltous oxide. The lefthand corner of the diagram represents 100% titania, and the righthand side opposite thereto 0% titania. The coordinates of the several polygon corners defining our broad and narrower composition polygons are as follows:

| Corner | Total $TiO_2$, percent | Combined $TiO_2$, percent | Free $TiO_2$, percent | CoO, percent | $Al_2O_3$, percent |
|---|---|---|---|---|---|
| A | 93 | 7.5 | 85.5 | 7 | 0 |
| B | 96 | 0 | 96 | 1.7 | 2.3 |
| C | 96.6 | 0 | 96.6 | 0.9 | 2.5 |
| D | 20 | 0 | 20 | 0.9 | 79.1 |
| E | 10 | 0 | 10 | 0.9 | 89.1 |
| F | 5 | 0 | 5 | 0.9 | 94.1 |
| G | 5 | 0 | 5 | 40.2 | 54.8 |
| H | 54 | 49 | 5 | 46 | 0 |
| I | 56.5 | 46.5 | 10 | 43.5 | 0 |
| J | 10 | 0 | 10 | 38.1 | 51.9 |
| K | 56 | 46 | 10 | 43 | 1 |
| L | 20 | 0 | 20 | 33.9 | 46.1 |
| M | 60.8 | 40.8 | 20 | 38.3 | 0.9 |

Figure 2:
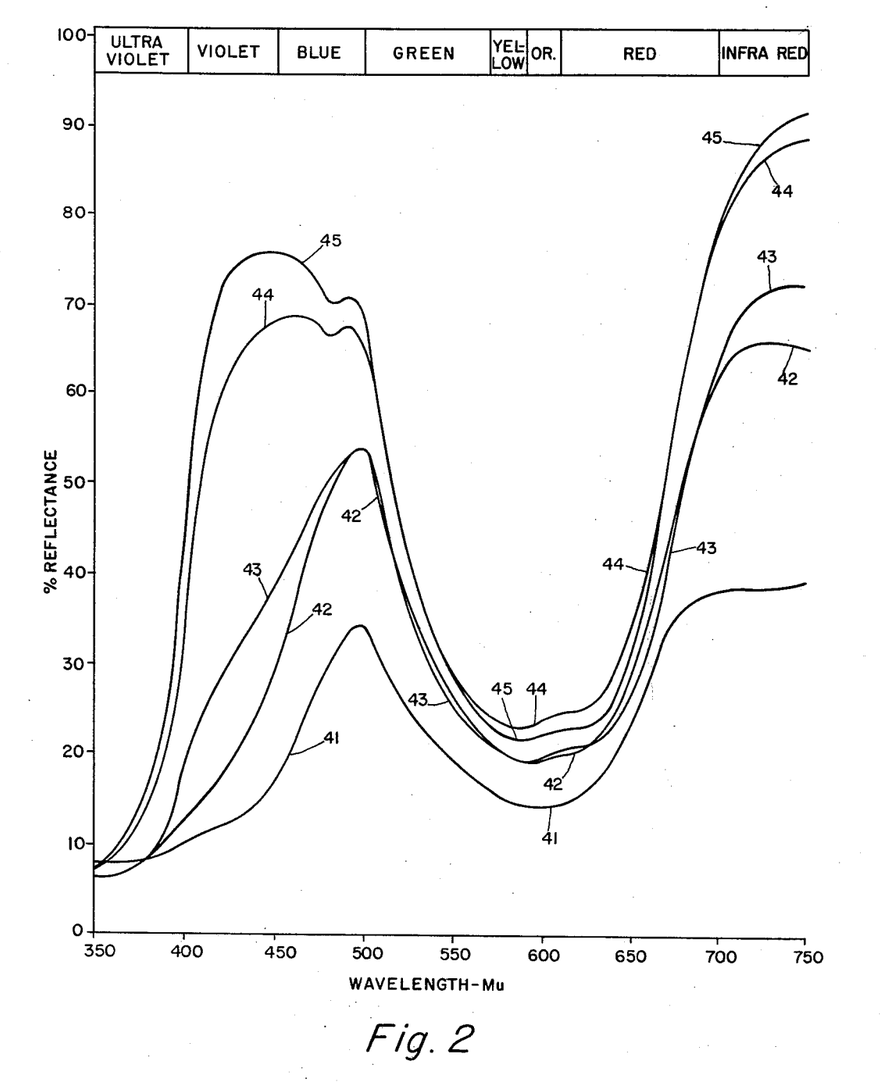

FIGURE 2 of the drawings shows several spectrophotometric reflectance curves which are typical of pigments of our invention. Curve 41 characterizes the green color obtained from compositions shown by point 1 on FIGURE 1. Curves 42, 43, 44, and 45 characterize the bluish-green to greenish-blue to blue colors which are obtained from pigments represented by points 2, 3, 4, and 19 of FIGURE 1.

Gradually increasing the equivalent alumina content in our pigments from 0% gradually changes the pigment color from green to bluish-green to greenish-blue and finally to blue. Those pigments lying above and to the left of line BG are blue. At a given titanium content the most intense blues of the system lie broadly along line BG. As the alumina content is increased at a constant $TiO_2$ level, the blue color intensity tends to decrease. Pigments above line DL are useful as they have blueness, and they extend the pigment comparatively economically with alumina.

Lines FG and GH terminate the polygon of FIGURE 1 where there is 5% uncombined titania, preponderantly in the rutile form. Less such titania than this causes the pigment to lose opacifying power. Advantageously, at least 10% uncombined titania is present in the pigment for this reason. This boundary is shown by lines EJ and JI. Lines DL and LM represent 20% uncombined titania in our coalesced pigment, which is for further advantage in this respect.

Line KA of FIGURE 1 shows alumina declining from 1% to 0% in green pigments. The green color strength of the pigments diminishes toward point A, hence the pigments' power to submerge bluish tints.

As the total titania concentration increases along the base of the polygon towards the lefthand corner, we have found some chromatic shift towards red in our coalesced products. This is not evident in physical mixtures of ingredients corresponding thereto. Furthermore, we have noted a loss of color purity to an undesirable degree in a coalesced product substantially beyond corner A, e.g., at point 12 and to the left thereof, which is without the polygons. Additionally, by going to a very low cobalt proportion (0.49% CoO) when alumina is present (point 18 on FIGURE 1) we have obtained unexpectedly a dirty light green pigment which is also undesirable, whereas our pigments containing a little less than 1% cobalt oxide and above 2½% alumina gave desirable bluish colors. Accordingly, the lefthand sides of the polygons, lines AC and CF, expressly avoid these undesirable regions.

Figure 3:
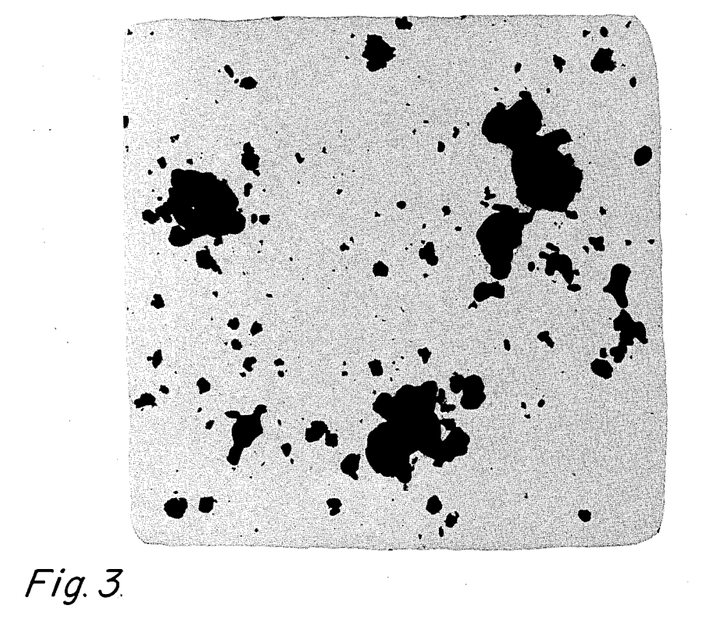

FIGURE 3 shows electron photomicrographs taken at about 9000 magnification. The top one is of a physical mixture of 88.8% cobalt metatitanate and 11.2% pigmentary titania. The bottom one is of one of our typical coalesced pigments corresponding in composition thereto (the empirical formulae of these pigments being 57.1% total $TiO_2$ and 42.9% CoO corresponding approximately to point 33 at corner I of FIGURE 1).

Figure 4:
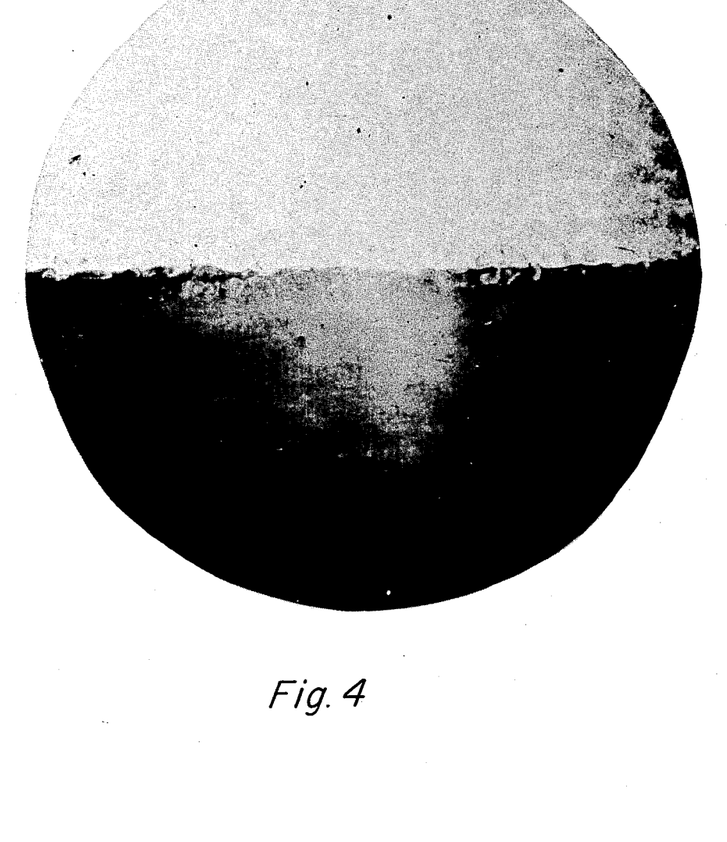

FIGURE 4 demonstrates the manifestly better paint films that can be obtained with our sort of pigments than with the corresponding physically mixed products. The figure is a photomicrograph at about 7 magnification, the upper portion of which is a paint film pigmented with a physically mixed pigment, and the lower portion of which is the same kind of paint film except that it contains the same amount of our corresponding coalesced pigment. The formulae of these pigments are both 50.4% uncombined titania and 49.6% cobalt metatitanate corresponding to 76% total titania and 24% CoO (point 1 of FIGURE 1). The white float of the physically mixed material and the resistance to float of our pigment in the paints is manifest. Also manifest is the stronger color found in our pigment.

Several polygonal areas defining particular species of our pigment compositions can be discussed more fully. Thus, narrower species ranging in color from blue to green are defined by polygon ACEJI of FIGURE 1; more narrowly by polygon ACEJK of FIGURE 1, and even more narrowly by polygon ACDLM of FIGURE 1.

The species of blue invention pigments are defined by polygon BCFG of FIGURE 1, and more narrowly by polygon BCEJ of FIGURE 1.

The species of green to bluish-green to greenish-blue invention pigments are defined by polygon ABGH of FIGURE 1, more narrowly by polygon ABJI of FIGURE 1, and even more narrowly by polygon ABJK of FIGURE 1.

The rutile titania-providing material in the preparation of our pigments can be conventional rutile-forming metatitanic acid cake or slurries thereof (an intermediate in the commercial process for forming rutile titanium dioxide pigment), titanic sulfate solutions suitable for conversion into rutile titania, or a rutile pigmentary titania such as that formed from an acid cake or by a conventional "chloride" process (hydrolysis or oxidation of $TiCl_4$). Preferably, rutile-forming metatitanic acid cake is used in our process to obtain the best sort of our coalesced pigments. Such acid cake can be made, for example, by the process of copending U.S. patent application S.N. 708,363, filed January 13, 1958, now U.S. Patent No. 2,971,821.

The cobaltous oxide-providing material for use in our process can be one or a mixture of cobaltous salts, anhydrous or hydrous cobaltous oxide, cobaltous sulfide, or elemental cobalt which are convertible to cobalt aluminate and/or cobalt metatitanate by calcining with the other essential components in a neutral to oxidizing atmosphere at a temperature between about 700° C. and about 1100° C. When water soluble cobaltous salts are used, it is desirable to precipitate the cobalt contained therein as a hydrous oxide or as cobaltous sulfide using a base such as sodium hydroxide, sodium carbonate, ammonium hydroxide, ammonium sulfide (e.g., ammonium hydroxide gassed with hydrogen sulfide), ammonium carbonate, and/or sodium sulfide.

Preferably ammonium compounds are used because no undesirable inorganic residue is left, and the raw pigment cake (i.e., "greencake") need not be washed free of such residue. When no alumina-providing agent, or very little, is used in making the greencake for our pigment production, it is advantageous to precipitate the cobalt as a sulfide so as to minimize cobalt losses to the filtrate. Various cobaltous salts that can be used include the sulfate, nitrate, carbonate, chloride, sulfide, and acetate. Carbonates are not considered organics for our purposes whereas acetates and other carboxylic salts are.

When organic materials, such as organic cobalt salts, organic aluminum compounds, organic solvents, etc. or the like are present, the organic fraction should be removed from the greencake, e.g., by chemically freeing the organic material, if necessary, and washing it or drying it out before the calcination step is attempted so that carbon residues are not left. These would impair the color and the value of the pigment.

The alumina-providing material is preferably an aluminum sulfate for efficiency and economy, and is converted into a hydrous aluminum oxide simultaneously with the precipitation of the cobaltous hydrous oxide or cobaltous sulfide as outlined above. Other water-soluble aluminum salts such as aluminum chloride, aluminum nitrate, and sodium aluminate also can be used. Alternatively, both the cobaltous oxide-providing material and alumina-providing material, if soluble in the reaction vehicle, can be dried with the rutile titania-providing material prior to calcination and thus effect a physical rather than a chemical precipitation. If desired, the alumina-providing material can be a separately prepared hydrous or, less desirably, anhydrous aluminum oxide. The preferred reaction vehicle for efficiency and economy in our process is water.

Calcining must be done between about 700° and about 1100° C. Below about 700° such conversion to our pigment as occurs is very slow or incomplete. Above about 1100° undesirable extraneous tints and undertones occur in the resulting pigment, and X-ray diffraction analyses indicate that titania is combining with alumina to form aluminum titanate in such instance. The blue or predominantly blue pigments of our invention are best made by calcining at a higher temperature than the green, advantageously from about 800° to 1000° and preferably about 950° to 1000°. It is advantageous to calcine the green or predominantly green pigments of our invention between about 700° and about 900°, and preferably at about 775°. The calcining is done in a neutral to oxidizing atmosphere.

Ordinarily, but not necessarily, an inorganic titania-conditioning agent is added to a greencake prior to calcination for one or more of these reasons: for its rutile-directing tendency; for preventing sintering or fusing together of individual pigment particles into undesirably large aggregates; for adding dispersibility to the pigment; for adding brightness or for masking a deleterious effect of some stray ion; or for improving the photochemical stability and chalk resistance or reducing phototropy of the pigment. Our pigment compositions are recited herein exclusive of any conditioning agent present and are so illustrated in FIGURE 1.

The titania-conditioning agent can be added as a solid, as a slurry, or as a solution in a solvent such as water. Conventionally, the greencake is repulped or otherwise intimately mixed with the titania-conditioning agent. Upon calcination, the calcined residue of the agent remains in the pigment, generally from about 0.5% to 5%, based on the weight of the pigment. If desired, in some cases, some or all of the calcined residue of the conditioning agent can be removed, as for example, by washing it out with water or a mineral acid solution. Agents giving an undesirable stray cast or undertone of color to the pigment should be avoided.

Suitable inorganic titania-conditioning agents include those containing an alkali metal such as sodium, potassium, and/or lithium. We have found it advantageous to use a mixture of sodium carbonate and phosphoric acid. Preferably the conditioning agent is used in a range of 1% to 2½% based on the weight of equivalent anhydrous titania in the greencake, and broadly up to about 5–10%. About 2% lithium sulfate is generally most highly preferred in treating our products made from metatitanic acid cake, although we have found also that about 1% of sodium carbonate and 2.5% $H_3PO_4$ is very good in such processing. Broadly, the alkali metal-containing titania-conditioning agents include, for example, the phosphates, sulfates, hydroxides, nitrates, chlorides, carbonates, bicarbonates, and sesquicarbonates. Organic salts are to be avoided for conditioning because upon calcination their carbon residue gives an inferior product. The superior titania conditioning agents are those which upon calcination give colorless or virtually colorless residues.

Summarizing, then, various techniques for making our greencakes before calcination, we prefer: to precipitate the hydrous oxide and/or the sulfide of cobaltous cobalt and the hydrous oxide of aluminum from dissolved salts of these elements in the presence of an aqueous suspension of rutile pigment-forming metatitanic acid cake to most easily obtain the greatest degree of coalescence in the finished pigment and, correspondingly, the greatest tinting strength per unit weight of cobalt used; to recover the resulting mixture by filtration; and to repulp the greencake with a conditioning agent such as 2% of lithium sulfate or 1% of sodium carbonate mixed with 2½% of $H_3PO_4$.

However, sufficient intimate association for good coalescence can be provided before calcination to give definite superiority over physically mixed corresponding pigments by the following alternative techniques: (a) precipitating the cobalt hydrous oxide or sulfide and aluminum hydrous oxide in the presence of a suspension of rutile pigmentary titania; (b) evaporating to dryness an aqueous suspension of rutile-forming metatitanic acid cake or rutile pigmentary titania in intimate association with dissolved oxide-forming (upon calcination) cobaltous cobalt and aluminum salts; (c) mechanically mixing separately prepared cobalt and aluminum hydrous oxides with rutile-forming metatitanic acid cake or rutile pigmentary titania; (d) mechanically mixing with very rigorous grinding separately prepared cobaltous oxide (CoO) and aluminum oxide ($Al_2O_3$) with rutile-forming metatitanic acid cake or rutile pigmentary titania; (e) or using an elemental cobalt metal powder as a substitute means for introducing cobalt in any of the aforementioned procedures. It should be stressed that the calcination is a cocalcination of all the ingredients in the greencake formed for producing our coalesced pigment. In any of the foregoing methods, the order of ingredient mixing and precipitation prior to calcination can be altered without basically changing the nature of the pigment products.

Examination of our products by X-ray diffraction is especially useful to determine their chemical constitution, and particularly the rutile titania content in the uncombined titania fraction. It should be understood that, while the pigment-forming reactions proceed preferentially to make cobaltous aluminate ($CoAl_2O_4$) when alumina-providing material is present, and cobaltous metatitanate ($CoTiO_3$) when there is cobalt in excess of the amount needed to form cobalt aluminate, the reactions do not occur precisely according to expected stoichiometry.

Thus, for example, an X-ray diffraction examination of one of our typical blue (cobalt-aluminum-titanium) pigments showed the uncombined titania to a preponderantly (i.e., at least 80%) rutile titanium dioxide, a moderate proportion of cobalt aluminate, a moderate amount of alpha aluminum oxide, an indication of a possible small amount of cobaltous cobaltic oxide ($CoCo_2O_4$), and a slight amount of material which we were unable to identify.

Similarly, an X-ray diffraction examination of one of our typical green (cobalt-titanium) pigments showed it to consist preponderantly of cobalt metatitanate and rutile titanium dioxide with an indication of a small amount of cobalt orthotitanate and possibly some $CoCo_2O_4$.

The following examples show ways in which our invention has been practiced and in which critical features of our invention were established.

In the examples all parts are parts by weight, all percentages are weight percentages, all temperatures are in degrees centigrade, the rutile fraction of the free titania present was above 80% and the metatitanic acid cake used was of a rutile-forming kind, except where otherwise expressly indicated. Where the term "metatitanic acid cake" is used hereinafter, what is meant is the precipitated titanium values made broadly in accordance with the teachings of Example 1 of copending U.S. patent application S.N. 708,363. Unless otherwise indicated the calcining was done in the presence of air. No combination of titanium with aluminum was detected in our invention pigment compositions, the combined titanium being ostensibly united with cobalt. The invention pigment compositions lie within the polygon ACFGH of FIGURE 1. The experimental compositions obtained are described by their approximate percentages of equivalent titania, alumina and cobaltous oxide as compounded and subject only to the small losses encountered in the normal handling of the materials in process; these percentages are exclusive of any titania-conditioning agent used.

A noteworthy observation was that some free alumina was found in certain aluminum-containing greenish pigments to the right of line BG of FIGURE 1, which indicated that the reaction to form cobalt metatitanate and cobalt aluminate in this region did not proceed precisely according to expected stoichiometry.

EXAMPLE 1

In the following experiments cobalt sulfate, $$CoSO_4 \cdot 7H_2O$$

and aluminate sulfate, $Al_2(SO_4)_3 \cdot 18H_2O$, were dissolved in an aqueous suspension of metatitanic acid cake which acid cake contained approximately 35% equivalent titania. The resulting mixture was neutralized with ammonium hydroxide, $NH_4OH$, and the neutralized slurry was filtered and washed with water. The filter cake was repulped with 1% of sodium carbonate based on the weight of equivalent anhydrous titanium dioxide used, dried, and calcined at 800–850°. The following table summarizes these experiments. The points indicated in this and the other examples following are shown on FIGURE 1 of the drawings:

| Expt. | Point | Reactants, parts | Pigment composition ||||
|---|---|---|---|---|---|---|
| | | | Percent TiO₂ ||| Percent CoO, total | Percent Al₂O₃, total |
| | | | Total | Free | Combined | | |
| 1 | 1 | Acid cake, 140; cobalt sulfate hydrate, 58.75. | 76.0 | 50.4 | 25.6 | 24.0 | 0 |
| 2 | 2 | Acid cake, 114.25; cobalt sulfate hydrate, 47; aluminum sulfate hydrate, 37.5. | 68.4 | 53.0 | 15.5 | 21.7 | 9.8 |
| 3 | 3 | Acid cake, 114.25; cobalt sulfate hydrate, 47; aluminum sulfate hydrate, 75. | 62.3 | 55.3 | 7.0 | 19.8 | 17.9 |
| 4 | 4 | Acid cake, 114.25; cobalt sulfate hydrate, 47; aluminum sulfate hydrate, 150. | 52.9 | 52.9 | 0 | 16.8 | 30.4 |
| 5 | 5 | Acid cake, 114.25; cobalt sulfate hydrate, 47; aluminum sulfate hydrate, 300. | 40.5 | 40.5 | 0 | 12.9 | 46.6 |
| 6 | 6 | Acid cake, 57.12; cobalt sulfate hydrate, 23.5; aluminum sulfate hydrate, 300. | 27.7 | 27.7 | 0 | 8.8 | 63.6 |

The pigment of experiment 1 was green. The pigment of experiment 2 was bluish-green. The pigment of experiment 3 was bluer, a definite blue-green. The products of experiments 4, 5, and 6 were blue, the product of experiment 5 being a darker blue than that of experiment 4, and a darker blue than that of experiment 6.

In a further experiment a mixture of cobalt sulfate and aluminum sulfate was neutralized, filtered, washed with water, and calcined at 800° independently of titania, then intimately mixed by ball milling with hydrous titanium oxide. The resulting mixture (which contained the same proportions of titania, cobaltous oxide and alumina as did the pigment of experiment 5) was neutralized, filtered, washed and recalcined at 800°. This product was substantially lighter and less blue than the product of experiment 5.

In an additional test a cobalt aluminate pigment having the same ratio of cobalt to alumina as the inventive pigment of experiment 5 was ground in linseed oil and compared with an oil paste of the product of experiment 5. This cobalt aluminate pigment possessed an intense blue color, but the oil paste therefrom was very transparent in comparison to the oil paste made from the pigment of experiment 5, and it exhibited poor opacity.

In the following examples, when cobalt and aluminum sulfates are referred to without qualification, the same kinds of these materials are meant as the kinds used in Example 1.

EXAMPLE 2

Cobaltous and aluminum sulfate were dissolved in an aqueous suspension of metatitanic acid cake which acid cake contained approximately 35% equivalent $TiO_2$. The resulting mixture was neutralized with ammonium hydroxide, then filtered and washed with water. The filter cake was repulped with 1% of sodium carbonate, based on the weight of anhydrous $TiO_2$ equivalent present, dried, and calcined at a temperature of 800–850° for one hour. The first five pigments produced corresponded to those obtained from the first five experiments of Example 1. This was done to verify reproducibility. Then a further group of experiments was made going down the line of points 13–18 of FIGURE 1 of the drawings. The following table summarizes these experiments:

| Expt. | Point | Reactants, parts | Pigment composition ||||
|---|---|---|---|---|---|---|
| | | | Percent TiO₂ ||| Percent CoO, total | Percent Al₂O₃, total |
| | | | Total | Free | Combined | | |
| 1 | 13 | Acid cake, 114.25; cobalt sulfate, 23.5; aluminum sulfate, 150. | 57.8 | 57.8 | 0 | 9.1 | 33.1 |

Pigment was a medium blue, lighter than the pigment from experiment 5 of Example 1.

| Expt. | Point | Reactants, parts | Pigment composition ||||
|---|---|---|---|---|---|---|
| | | | Percent TiO₂ ||| Percent CoO, total | Percent Al₂O₃, total |
| | | | Total | Free | Combined | | |
| 2 | 14 | Acid cake, 114.25; cobalt sulfate, 11.75; aluminum sulfate, 75. | 73.2 | 73.2 | 0 | 5.8 | 21.0 |

Pigment was a medium blue, lighter than the product from experiment 1 of this example.

| Expt. | Point | Reactants, parts | Pigment composition ||||
|---|---|---|---|---|---|---|
| | | | Percent TiO₂ ||| Percent CoO, total | Percent Al₂O₃, total |
| | | | Total | Free | Combined | | |
| 3 | 15 | Acid cake, 114.25; cobalt sulfate, 5.87; aluminum sulfate, 37.5. | 84.5 | 84.5 | 0 | 3.4 | 12.2 |

Pigment was a light blue, lighter than the pigment from experiment 2 of this example.

| Expt. | Point | Reactants, parts | Pigment composition | | | | |
|---|---|---|---|---|---|---|---|
| | | | Percent TiO$_2$ | | | Percent CoO, total | Percent Al$_2$O$_3$, total |
| | | | Total | Free | Combined | | |
| 4 | 16 | Acid cake, 114.25; cobalt sulfate, 2.94; aluminum sulfate, 18.8. | 91.6 | 91.6 | 0 | 1.8 | 6.6 |

Pigment was a sky blue, lighter than the pigment from experiment 3 of this example.

| Expt. | Point | Reactants, parts | Pigment composition | | | | |
|---|---|---|---|---|---|---|---|
| | | | Percent TiO$_2$ | | | Percent CoO, total | Percent Al$_2$O$_3$, total |
| | | | Total | Free | Combined | | |
| 5 | 17 | Acid cake, 114.25; Cobalt sulfate, 1.47; Aluminum sulfate, 9.4. | 95.60 | 95.60 | 0 | 0.96 | 3.44 |

Pigment was a light baby blue, lighter than the pigment from experiment 4 of this example.

| Expt. | Point | Reactants, parts | Pigment composition | | | | |
|---|---|---|---|---|---|---|---|
| | | | Percent TiO$_2$ | | | Percent CoO, total | Percent Al$_2$O$_3$, total |
| | | | Total | Free | Combined | | |
| 6 | 18 | Acid cake, 114.25; Cobalt sulfate, 0.74; Aluminum sulfate, 4.7. | 97.75 | 97.75 | 0 | 0.49 | 1.76 |

Pigment was a dirty light green with no blueness visible.

The last experiment demonstrates the criticality of going below about 0.9% cobaltous oxide in pigments of our type when aluminum is present. Point 18 lies just below and to the left of corner C of FIGURE 1, whereas points 17 and 16, which produced satisfactory pigments, lie within the polygon above and to the right of corner C.

EXAMPLE 3

The following experiments show embodiments of our process wherein an alternative rutile titania-providing material and an alternative cobaltous oxide-providing material were used. The first pigment composition corresponded to that of experiment 5 of Example 1 (40.5% TiO$_2$, 12.9% CoO, and 46.6% Al$_2$O$_3$).

(Experiment 1) Cobaltous sulfate and aluminum sulfate were intimately mixed into an aqueous suspension of pigmentary rutile titania. The resulting mixture was neutralized with ammonium hydroxide, filtered, and washed free of sulfate ions with water. The filter cake was repulped with 1% of sodium carbonate based on the equivalent anhydrous titania present, dried, and calcined at 800–850°. The pigment was a very clean, bright, homogeneous blue material which possessed a color intensity slightly lower than that of the comparable pigment made in accordance with experiment 5 of Example 1.

(Experiment 2) The proportions of reactants used in this experiment were chosen to yield a pigment containing 76% TiO$_2$ and 24% CoO, this corresponding to that of experiment 1 of Example 1. There was intimately mixed 0.617 part of finer than 325 mesh (U.S. standard sieve size) cobalt metal powder and 6.9 parts of metatitanic acid cake containing 35% equivalent titania. The resulting mixture was repulped with 1% of sodium carbonate based on the anhydrous titania equivalent, and calcined in the presence of air at 850° for 3.5 hours. The product was a medium green pigmentary material closely resembling that made in experiment 1 of Example 1.

EXAMPLE 4

In the following experiments different bivalent cobaltous salts were employed and the proportions of reactants were chosen so that the composition of the calcined pigment product was 40.5% TiO$_2$, 12.9% CoO and 46.6% Al$_2$O$_3$. In each experiment cobaltous salt and aluminum sulfate were dissolved in an aqueous suspension of metatitanic acid cake, which acid cake contained 40.2% equivalent TiO$_2$. The resulting mixture was neutralized with ammonium hydroxide, and the neutralized slurry was filtered and washed with water. The filter cake was repulped with 2% H$_3$PO$_4$ plus 1% Na$_2$CO$_3$ (on a total dry pigment weight basis), dried, and calcined for one hour at 850°.

| Expt. | Reactants, parts | Results |
|---|---|---|
| 1 | Acid cake, 24.88; hydrated cobaltous carbonate containing 47.04% Co, 5.31; aluminum sulfate, 75. | Pigment blue, essentially equivalent to that of Experiment 5 of this example. |
| 2 | Acid cake, 24.88; hydrated cobaltous nitrate containing 20.16% Co, 12.4; aluminum sulfate, 75. | Do. |
| 3 | Acid cake, 24.88; hydrated cobaltous chloride containing 24.79% Co, 10.1; aluminum sulfate, 75. | Do. |
| 4 | Acid cake, 24.88; hydrated cobaltous acetate containing 23.52% Co, 10.62; aluminum sulfate, 75. | Pigment blue, slightly darker than any of the other pigments in this series and that of Experiment 5 of this example. |
| 5 | Acid cake, 24.88; hydrated cobaltous sulfate containing 22.45% Co, 11.13; aluminum sulfate, 75. | Pigment blue, used as a control in this series of experiments. |

EXAMPLE 5

In this series of experiments various inorganic titania-conditioning agents were applied to the pigments, and their effects on maximum rutilization of the free titania, color intensity, and hiding power of the pigment were observed.

In the first phase of this series cobaltous sulfate, aluminum sulfate and an aqueous suspension of rutile-type metatitanic acid cake which acid cake contained 39.4% TiO$_2$ were proportioned to produce a slurry for a pigment containing 43.2% TiO$_2$, 13.7% CoO, and 43.1% Al$_2$O$_3$. The slurry was neutralized with ammonium hydroxide, filtered, and washed with water. The resulting filter cake was divided into parts. One part was repulped with 1% Na$_2$CO$_3$ (based on the weight of a resulting pigment); a second part was repulped with 1% Na$_2$CO$_3$ plus 2.5% H$_3$PO$_4$; a third part was repulped with 2.1% Li$_2$SO$_4$ (corresponding stoichiometrically to about 2% sodium carbonate); and a fourth part was repulped with 3% Li$_2$CO$_3$. Each so-treated part was dried at 130°, then divided into portions and calcined as follows:

A first portion for one hour at 850°, then one hour at 925°.

A second portion for one hour at 850°, then one hour at 950°.

A third portion for one hour at 850°, then one hour at 975°.

A fourth portion for one hour at 850°, then one hour at 1000°.

The results of this study are set forth in the following table:

*Percent Rutilization of Uncombined Titania in Pigment*

| Portion | 1% $Na_2CO_3$ | 1% $Na_2CO_3$ plus 2.5% $H_3PO_4$ | $LiSO_4$ corresponding to 2% $Na_2CO_3$ | 3% $Li_2CO_3$ |
|---|---|---|---|---|
| First | 86 | 50 | 80 | 75 |
| Second | 88 | 80 | 88 | 82 |
| Third | 96 | 80 | 92 | 90 |
| Fourth | 100 | 95 | 100 | 95 |

In a further extension of this series of experiments a greencake, which had been prepared with 1% sodium carbonate in the manner of the immediately preceding series and which had the same fundamental composition, was divided into five parts and calcined as outlined below:

Part 1—850° for one hour, then 950° for one hour
Part 2—850° for one hour, then 975° for one hour
Part 3—850° for one hour, then 1000° for one hour
Part 4—850° for one hour, then 1050° for one hour
Part 5—850° for one hour, then 1100° for one hour Each of the resulting pigments was ground thoroughly and dispersed in the proportion of 1.75 grams in 7 cc. of alkyd resin vehicle and 1 cc. of xylol using a shaker mill with glass beads.

Correlatively with this a commercially-available cobalt aluminate blue pigment, containing 27.9% equivalent CoO, 62.9% equivalent $Al_2O_3$, and 4.4% equivalent $SiO_2$ (the balance comprising impurities), was dispersed with rutile titania pigment using a proportion of 0.994 gram of the commercial cobalt aluminate blue pigment with 0.756 gram of the titania in 7 cc. of the same kind of alkyd resin vehicle and 1 cc. of xylol on the shaker mill to give a physically mixed blue pigment fraction containing 43.2% $TiO_2$, 15.8% CoO, 35.7% $Al_2O_3$, and 2.5% $SiO_2$ (as compared to our coalesced test pigments having 43.2% $TiO_2$, 13.7% CoO, and 43.1% $Al_2O_3$).

A further correlative pigment was compounded from rutile titania pigment and a cobalt aluminate blue pigment containing 75.9% alumina and 24.1% cobalt oxide, said cobalt aluminate blue having been prepared in the same manner as our corresponding coalesced pigments but without the inclusion of titania, and further having been divided into various portions and calcined at the five temperatures, respectively, to give a set of standards "C." Paint grinds with rutile pigmentary titania were made for this set of standards in the same way as for the commercial pigment.

Paint films from each of the paint grinds were applied to Morest cards using a #4 equalizer rod, then allowed to dry.

Briefly, the test results were: The coalesced titanium-cobalt-aluminum pigments calcined first at 850° then afterward at 950° and at 975° equalled the hiding power of the commercial cobalt aluminate blue pigment physically mixed with titania and were superior to it in color intensity. However, the coalesced pigments calcined at 1000° C. and higher, though considerably superior to the commercial cobalt aluminate blue in color intensity, had a somewhat weaker hiding power.

Additionally, the coalesced products were far superior in color intensity to those of standards C, and those coalesced products calcined first at 850°, then at 950° and 975°, were superior to all of the standards C in hiding power.

Important observations from this series of tests were that: the blue coalesced pigments developed maximum hiding power when calcined at temperatures of 950–975°; those calcined at lower temperatures such as 925° exhibited only slightly reduced hiding power; and those calcined at the higher temperatures such as 1000 plus degrees lost some hiding power. A further observation in this series of tests was that the coalesced pigments were softer and easier to grind and to disperse in a paint vehicle than were the separately incorporated titania and cobalt aluminate blue pigments.

EXAMPLE 6

A series of experiments were run testing the relative effects of different rutile titania-conditioning treatments on the photochemical reactivity of the blue coalesced titanium-cobalt-aluminum pigments of our invention. This pigment property comprises the photooxidizing effect of titanium dioxide on materials in contact with it. The photooxidizing effect is a contributing factor in the paint film breakdown which occurs during chalking. The test for this effect entails the rating of the relative darkening (oxidation) of silver salts absorbed on the pigment particles when samples thereof are exposed to ultraviolet light. The less the darkening, the greater is the photochemical stability of the pigment.

The pigment greencakes were made by dissolving cobaltous sulfate and aluminum sulfate in an aqueous suspension of rutile-type metatitanic acid cake, which acid cake contained 39.4% equivalent $TiO_2$. The resulting mixture was neutralized with ammonium hydroxide, and the slurry was filtered and washed. The proportions of reactants were chosen so that the calcined pigment resulting would contain 43.2% $TiO_2$, 13.7% CoO, and 43.1% $Al_2O_3$. The filter cake was divided into four parts. The first part was treated with 1% of sodium carbonate based on the weight of resulting dry pigment; the second part was treated with 1% $Na_2CO_3$ and 2.5% $H_3PO_4$; the third part treated with 2.1% $Li_2SO_4$, and the fourth part was treated with 3% $Li_2CO_3$.

Each part was dried at 130° and calcined for one hour at 850°, followed by one hour at 1000° C. The uncombined titania portion of each pigment was shown by X-ray diffraction to contain 95% or more rutile. The pigments were ground, and five grams of each were mixed with water to form thick paste. Silver nitrate solution, 0.25 cc. of 0.1 N, was mixed thoroughly with each paste, and the pastes were then placed on a spot test plate and exposed to intense ultraviolet light for 15 minutes at a distance of one foot. The first pigment darkened pronouncedly, and the fourth pigment exhibited moderate darkening, whereas the second and third pigments exhibited no visible change and were, therefore, superior to the first and fourth in photochemical stability.

A further series of similar tests were run on the same kind of pigment in order to study the effect of varying the proportion of lithium sulfate. The results are tabulated below:

| Percentage of $Li_2SO_4$ conditioning agent | Calcination | Percent rutile | Photochemical reactivity |
|---|---|---|---|
| 0.5 | 850° for 1 hr. then 1,000° for 1 hr. | 100 | Moderate darkening. |
| 1.0 | do | 100 | Do. |
| 2.0 | do | 100 | Slight darkening. |
| 0.5 | 850° for 1 hr. then 950° for 1 hr. | 96 | Heavy darkening. |
|  | Immediately previous sample recalcined at 975° for 1 hr. | 100 | Moderate darkening. |
|  | Same except recalcined at 1,000° for 1 hr. | 100 | Do. |
| 1.0 | 850° for 1 hr. then 950° for 1 hr. | >99 | Heavy darkening. |
|  | Immediately previous sample recalcined at 975° for 1 hr. | >99 | Do. |
|  | Same except recalcined at 1,000° for 1 hr. | 100 | Moderate to heavy darkening. |
| 2.0 | 850° for 1 hr. then 950° for 1 hr. | 94 | Heavy darkening. |
|  | Immediately previous sample recalcined at 975° for 1 hr. | 100 | Moderate darkening. |
|  | Same except recalcined at 1,000° for 1 hr. | 100 | Slight darkening. |
| 3.0 | 850° for 1 hr. then 950° for 1 hr. | 95 | Heavy darkening. |
|  | Immediately previous sample recalcined at 975° for 1 hr. | >99 | Moderate darkening. |
|  | Same except recalcined at 1,000° for 1 hr. | 100 | Do. |

EXAMPLE 7

In another series of experiments a number of our pigments were made to have a composition falling along line NO of FIGURE 1. This was to determine at which point maximum blue color intensity and purity were obtainable when using an equivalent $CoO:TiO_2$ weight ratio 0.317:1.00 and at a calcination temperature of 850°.

In this series of experiments said weight ratio was maintained, and the equivalent alumina to cobaltous oxide plus titania weight ratio was varied. Cobaltous sulfate and aluminum sulfate in each experiment were dissolved in an aqueous suspension of rutile-type metatitanic acid cake, which acid cake contained 39.5% equivalent $TiO_2$. The resulting mixture was neutralized with ammonium hydroxide, and the neutralized slurry was filtered and washed with water. The filter cake was treated with 1% $Na_2CO_3$ based on the weight of resulting pigment, dried, then calcined at 850° for one hour. The resulting pigment was ground, dispersed in water, filtered, washed to remove soluble salts, and dried. The dried pigment was dispersed in linseed oil for evaluation of its color. The table below summarizes these preparations.

| Experiment No. | Point on Fig. 1 | Composition | | |
|---|---|---|---|---|
| | | Percent total $TiO_2$ | Percent CoO | Percent $Al_2O_3$ |
| 1 | 4 | 52.8 | 16.8 | 30.4 |
| 2 | 21 | 49.8 | 15.8 | 34.4 |
| 3 | 22 | 46.2 | 14.7 | 39.1 |
| 4 | 23 | 44.6 | 14.2 | 41.2 |
| 5 | 19 | 43.2 | 13.7 | 43.1 |
| 6 | 24 | 41.8 | 13.3 | 44.9 |
| 7 | 5 | 40.5 | 12.9 | 46.6 |

The product of experiment 5, above, was a purer and stronger blue than any of the other products in this series. This established 0.758:1.00 as the optimum equivalent $Al_2O_3:(CoO$ plus $TiO_2)$ ratio for maximum pigment blueness at a $CoO:TiO_2$ ratio of 0.317:1.00 and at a calcination temperature of 850°.

EXAMPLE 8

The following series of experiments were run broadly in the manner of Example 1, except that no cake conditioning was used and calcining was done in the range of 850–1000°. The following table summarizes the pigment compositions produced. The points indicated are shown on FIGURE 1 of the drawings.

| Point | Percent $TiO_2$ | Percent CoO | Percent $Al_2O_3$ | Result |
|---|---|---|---|---|
| 51 | 43.2 | 17.4 | 39.4 | This was the bluest pigment of the series. |
| 19 | 43.2 | 13.7 | 43.1 | This pigment was lighter blue than that of Point 51. |
| 52 | 43.2 | 11.2 | 45.6 | This pigment was the lightest blue of the series. |

A further series of test pigments was made in a higher equivalent alumina range again maintaining the proportion of $TiO_2$ constant and varying the equivalent alumina to cobaltous oxide ratio. The procedure used was similar to that used in Example 1 except that the greencakes were treated with 1% sodium carbonate and 2½% phosphoric acid based on the weight of resulting finished pigment. The greencakes were each calcined for one hour at 850°.

Linseed oil pastes were made from the finished pigments. The following table gives the results.

| Point | Percent $TiO_2$ | Percent CoO | Percent $Al_2O_3$ | Result |
|---|---|---|---|---|
| 55 | 20.0 | 20.5 | 59.5 | This was the darkest blue pigment made in this series. |
| 53 | 20.0 | 18.3 | 61.7 | This was the lightest blue pigment made in this series. |
| 54 | 20.0 | 19.3 | 60.7 | This was intermediate in color intensity. |

In a still further test, using a very high ratio of alumina, a blue pigment was made broadly in accordance with the procedure of Example 1, except that the greencake was not salt-treated, and it was calcined at 1000° for one hour. The empirical pigment composition was 85% alumina, 7.5% titania, and 7.5% cobaltous oxide corresponding to point 36 of FIGURE 1.

EXAMPLE 9

A series of cobalt metatitanate-titanium dioxide green pigments of our invention were prepared by four different procedures. In the first experiment 96.2 parts of rutile-forming metatitanic acid cake containing 39.5% equivalent $TiO_2$ was mixed to form a slurry with 44.9 parts of $CoSO_4 \cdot 7H_2O$ dissolved in a minimum amount of water. The slurry was dried in an oven at 120°, then calcined for one hour at 850°. Portions of the calcinate were then re-calcined for one hour at 900°, 950°, and 975°, respectively.

Masstones in linseed oil rubbed on the above products showed that the pigment calcined at 975° had the cleanest green color. The pigment contained 76% equivalent titania and 24% equivalent cobaltous oxide.

In the second experiment of the series the same kind of reactants were used in the same proportions. The pH of the slurry was raised to 8.5 by neutralizing with ammonium hydroxide and the slurry was conditioned with 1% sodium carbonate (on an equivalent $TiO_2$ basis). The slurry was then dried at 120° in an oven, and portions of the resulting cake were ground and calcined for one hour at 800°, 850° and 900°, respectively.

Test paint grinds of the type described in Example 5 were made on these portions of pigment which had been calcined at the various temperatures, and each was compared with a corresponding paint grind made by incorporating individually therein an equivalent amount of pigmentary rutile titania and separately-prepared pigmentary cobalt, metatitanate (containing 51.66% equivalent titania and 48.4% equivalent cobaltous oxide, prepared otherwise by the same method as used for the coalesced pigment greencakes of this example and calcined for one hour at 850°). The coalesced cobalt metatitanate-titanium dioxide pigment of our invention that was calcined at 800° was found to have a much greater color intensity than, and about equivalent hiding power to, the corresponding physically mixed pigment combination.

In the third experiment 2000 parts of rutile-forming metatitanic acid cake containing 38% equivalent $TiO_2$ was slurried in 4000 parts of water and to this was added 899 parts of cobaltous sulfate heptahydrate that had been dissolved in 2000 parts of water. The resulting slurry was agitated mechanically and aqueous ammonium hydroxide, which had been gassed with hydrogen sulfide, was added slowly until the pH rose to 8.0. Aqueous sodium sulfide solution (40 grams of sulfide ion per liter) was added to precipitate the cobalt which still remained in solution, and the slurry was thinned with additional water to reduce its viscosity.

The slurry was filtered, and the filter cake was then treated with 1% sodium carbonate (on an equivalent titania basis). The acid cake was heated for one hour at 650°, then ground and calcined for one hour at 750° and for two additional hours at 775° to essentially complete the rutilization of the uncombined titania.

The calcined pigment, which contained 76% equivalent titania and 24% equivalent cobaltous oxide, was milled in a ball mill, hydroseparated, washed and dried, then broken up in a hammer mill. Test paint grinds made with this pigment showed that it had as strong a green color and as good a hiding power as the coalesced pigment of the second experiment.

In the fourth experiment a coalesced pigment was made to have 76% equivalent titania and 24% equivalent cobaltous oxide by slurrying an aqueous solution containing 90 parts of cobaltous sulfate heptahydrate with 218 parts of rutile-forming metatitanic acid cake which contained 35% equivalent $TiO_2$. The pH was raised to 9.2 by the slow addition of 10% aqueous sodium hydroxide. The solids were recovered by filtration and washed with alkaline water (sodium hydroxide added to give pH 10.0). The washed solids were divided into two parts. One part was calcined without further treatment, and the other was treated before calcination with 1% sodium carbonate on an equivalent titania basis. Both materials were calcined until rutilization was 98% complete.

Test paint grinds made from the two parts of the fourth experiment showed that the untreated material had a very slightly purer green color than the treated material, which had a yellow undertone; and both had a less intense color than the product produced by sulfide precipitation in the third experiment of this example.

The product from the third experiment was incorporated into a "Lucite" (polymethyl methacrylate) plastic. The pigment was readily dispersed in the plastic and the finished test chip had an attractive green color and high opacity.

EXAMPLE 10

A coalesced blue pigment of our invention, which was found by wet chemical analysis to contain 42.4% equivalent $TiO_2$, 12.0% equivalent CoO, and 45.1% equivalent $Al_2O_3$, was compared in color strength to two commercial cobalt aluminate blue pigments. Wet chemical analysis showed that the first commercial pigment contained 27.9% cobaltous oxide equivalent, 62.9% alumina equivalent, and 4.4% silica equivalent, and that the second contained 33.5% cobaltous oxide equivalent, 57.5% alumina equivalent and 5.0% silica.

Linseed oil pastes were made from the commercial blues compounded with pigmentary titania on the one hand and our coalesced pigment on the other hand. The actual amount of titania was the same in all the samples and the weight fraction of the commercial blue was varied in the physically mixed pastes until a match in color intensity for the coalesced product was obtained.

The results of this test showed that there was 33.8% less cobalt in the paste containing our coalesced pigment than in the matching paste containing the first commercial blue; and that there was 34.8% less cobalt in the paste containing our coalesced pigment than in the matching paste containing the second commercial blue. Thus, it can be said that our coalesced pigment has a significantly higher inherent color strength, and that cost savings can result from the use of our pigment because cobalt is a relatively expensive color-imparting component.

EXAMPLE 11

In the first aspect of these experiments three coalesced green pigments and a pure cobalt metatitanate green pigment were made. The coalesced pigments were made from a slurry of cobaltous sulfate solution and rutile-forming metatitanic acid cake, which slurry was neutralized with an ammonium hydroxide solution gassed with hydrogen sulfide to precipitate cobalt. The resulting solids were recovered by filtration, washed, treated with 1% sodium carbonate on the basis of equivalent $TiO_2$, dried, and calcined at 775° for one hour. The pigment compositions were as follows:

| Empirical composition | Approximate chemical composition | Point on FIG. 1 |
|---|---|---|
| 85% $TiO_2$, 15% CoO | 31% $CoTiO_3$, 69% free $TiO_2$ | 31 |
| 65% $TiO_2$, 35% CoO | 73% $CoTiO_3$, 27% free $TiO_2$ | 32 |
| 57% $TiO_2$, 43% CoO | 89% $CoTiO_3$, 11% free $TiO_2$ | 33 |

To prepare the 100% cobalt metatitanate, the same rutile-forming metatitanic acid cake as used in the foregoing preparations was neutralized with aqueous ammonia, then washed free of sulfate ions with water. Enough cobalt carbonate to combine stoichiometrically for forming cobalt metatitanate was mixed thoroughly into the resulting filter cake; the cake was dried at 95°, then ground and calcined at 900° for 3.5 hours.

The three coalesced green pigments were ground with glass beads in an alkyd resin grinding vehicle in a shaker mill. The paints so obtained were applied to Morest cards in juxtaposition to paints similarly made by individually incorporating sufficient of the foregoing separately prepared cobalt metatitanate and separately prepared pigmentary rutile titania to give the same empirical compositions. In all instances the coalesced pigments produced paint films of stronger and purer green colors than those produced by the comparable physical mixtures of the separately-prepared pigments.

Additionally, test tubes containing the paints made from the coalesced products were allowed to stand alongside test tubes containing paints embodying the physical mixtures. A pronounced separation of titania from the green cobalt metatitanate in the paints embodying the physical mixtures was observed, but there was virtually no such separation, even after long standing, in any of our coalesced products.

A further series of tests was made to compare the color characteristics of our coalesced cobalt-titanium green pigments with corresponding physical mixtures of cobalt metatitanate and pigmentary rutile titania.

In this series all the physical mixtures were prepared by grinding admixtures of cobalt metatitanate, prepared as outlined hereinbefore in this example, and rutile titania pigment in water with glass beads in a shaker mill. The resulting products were coagulated, filtered, dried, and further ground for testing. Our coalesced products were prepared by neutralizing a slurry of rutile-forming metatitanic acid cake and cobaltous sulfate solution with an ammonium hydroxide solution gassed with hydrogen sulfide to precipitate cobalt, filtering off solids, washing them with water, treating them with 1% sodium carbonate based on the equivalent $TiO_2$ present, drying, and calcining at 775° for one hour.

The color differences between the coalesced and the physically mixed products from spectrophotometric study can be expressed in terms of dominant wave length, color purity, and brightness in the C.I.E. system. The first table below gives the composition of the pigments, and the second table defines the color differences we observed.

TABLE 1

| Sample No. | Type | Total $TiO_2$, Percent | CoO, Percent | Point on FIG. 1 |
|---|---|---|---|---|
| 1 | Physically mixed | 76 | 24 | |
| 2 | Coalesced | 76 | 24 | 1 |
| 3 | Physically mixed | 95 | 5 | |
| 4 | Coalesced | 95 | 5 | 12 |
| 5 | Physically mixed | 57 | 43 | |
| 6 | Coalesced | 57 | 43 | 33 |
| 7 | Pure cobalt metatitanate | 51.6 | 48.4 | 26 |

TABLE 2

| Sample | Dominant wave length, mu | Color purity, Percent | Brightness, Percent |
|---|---|---|---|
| 7 | 497.5 | 30.0 | 7.40 |
| 5 (physically mixed) | 497.5 | 23.0 | 11.44 |
| 1 (physically mixed) | 495.0 | 14.5 | 26.79 |
| 3 (physically mixed) | 493.5 | 8.0 | 51.81 |
| 6 (coalesced) | 498.0 | 26.0 | 12.09 |
| 2 (coalesced) | 503.0 | 15.0 | 21.62 |
| 4 (coalesced) | 549.0 | 11.5 | 41.95 |

The data show that the TiO$_2$ has the expected effect of increasing brightness while decreasing the color purity, regardless of whether it is incorporated into the pigment by physical mixture or otherwise. However, the changes in brightness are somewhat less pronounced with our coalesced pigments, indicating a stronger color than with the physically mixed pigments.

Of greater significance is the shift in the dominant wave length shown by the coalesced products as their total titania concentration increases. This chromatic shift, which is toward the red, was not found in the physical mixtures.

Thus, the above color analyses show clearly that the coalesced and the physically mixed products of equivalent empirical composition are unlike in color. Significantly also, the study shows that the color purity of the coalesced products decreases significantly and the chromatic shift increases as compositions approaching point 12 (5% CoO) are reached. Accordingly, corner A of the polygons of FIGURE 1 is terminated at 7% cobalt oxide when no alumina is present. Such cobalt-titanium pigment (7% CoO) and those with more cobalt are highly advantageous for use in paints.

EXAMPLE 12

In a departure from our preferred procedure of using rutile-forming metatitanic acid cake as a starting material for the preparation of our coalesced blue $$TiO_2\text{—}CoO\text{—}Al_2O_3$$

pigment we substituted a conventional anatase-forming acid cake therefor and attempted to convert the resulting anatase-containing free titania fraction of the resulting pigment largely into rutile by conventional high temperature calcination.

An aqueous suspension of anatase type metatitanic acid cake containing cobaltous sulfate heptahydrate and aluminum sulfate octadecahydrate dissolved therein was neutralized with ammonium hydroxide, and a small amount of sodium sulfide solution was added to insure complete precipitation of the cobalt. The solids were recovered by filtration, washed free of soluble salts, then treated with 1% Na$_2$CO$_3$ (on an equivalent TiO$_2$ basis). The quantities of reactants were chosen to produce a calcined pigment containing 43.2% TiO$_2$, 13.7% CoO, and 43.1% Al$_2$O$_3$ (approximating point 19 of FIGURE 1). The resulting filter cake was dried and mildly calcined in a muffle furnace at 850° C., divided into four parts, and each part further calcined at various higher temperatures.

The calcination at 1000° C. gave a pigment which showed by X-ray diffraction only 16% rutile content and 84% anatase content in the uncombined titania.

The part calcined at 1100°, while showing 97.5% rutile content and only 2.5% anatase content in the uncombined titania, gave a pigment that was a slightly dirty blue with a brown undertone. The part calcined at 1200° gave a pigment that was a dark blackish-gray. The part that was calcined at 1325° gave a brownish green pigment.

Extending this testing further, the part that was calcined at 1100° was incorporated into a paint grind and compared with an identical paint grind except that the pigment therein used was our coalesced pigment (which was made from rutile-type metatitanic acid cake) having a composition corresponding to point 19 of FIGURE 1 and calcined at 975°. The pigment made from the rutile-type metatitanic acid cake exhibited much higher hiding power in the paint film than did the analogous pigment made from the anatase-type cake.

Further studies on the anatase-rich pigments that were calcined at elevated temperatures in an attempt to rutilize them indicated that aluminum had combined with titanium to form aluminum titanate of approximate formula Al$_2$TiO$_5$, whereas, in the pigments of our invention, the combined titanium appeared to be exclusively combined with cobalt and there was no or virtually no titanium combined with aluminum in the pigments.

We claim:

1. A process for manufacturing oxidic blue-to-green pigments which comprises compounding an intimate mixture of a cobaltous oxide-providing material, alumina-providing material, and rutile-forming metatitanic acid cake in a proportion of titanium to cobalt to aluminum, expressed as said oxides, defined in polygon ACFGH of FIGURE 1, and calcining said mixture at a temperature between about 700° and about 1100° C.

2. Oxidic blue-to-green pigments consisting essentially of the product of calcining at a temperature between about 700° and about 1100° C. an intimate mixture of cobaltous oxide-providing material, alumina-providing material, and rutile-forming metatitanic acid cake in a proportion of titanium to cobalt to aluminum, expressed as said oxides, defined in polygon ACFGH of FIGURE 1, there being about 5 to 96.6% free and combined titania, said free titania being preponderantly rutile titania and comprising at least about 5% of the pigment composite, and there being virtually no titanium in said composite combined with aluminum.

3. The process of claim 1 wherein said calcining is done in the presence of between about 0.5% and about 5% of the calcined residue an inorganic titania-conditioning agent.

4. The process of claim 1 wherein cobaltous oxide-providing material is in the form of a dissolved salt and is precipitated as the sulfide of cobaltous cobalt in the presence of an aqueous suspension of rutile-forming metatitanic acid cake prior to said calcining.

5. The process of claim 1 wherein the cobaltous oxide- and alumina-providing materials are in the form of dissolved salts and are evaporated to dryness prior to said calcining.

6. The process of claim 1 wherein the cobaltous oxide- and alumina-providing materials are extraneously prepared cobaltous and aluminum hydrous oxides, and they are mechanically mixed with rutile-forming metatitanic acid cake.

7. The process of claim 1 wherein the cobaltous oxide- and alumina-providing materials are unhydrated cobaltous oxide and unhydrated alumina, and they are intensively mixed with rutile-forming metatitanic acid cake.

8. The process of claim 1 for manufacturing oxidic blue pigments wherein the proportions of titanium to cobaltous cobalt to aluminum, expressed as their oxides, are defined in polygon BCFG of FIGURE 1 and the calcining is done at a temperature from 800° to 1000° C.

9. The process of claim 1 for manufacturing oxidic green-to-blue-green pigments wherein the proportions of titanium to cobaltous cobalt to aluminum, expressed as their oxides, are defined in polygon ABGH of FIGURE 1; and the calcining is done at 700° to 900° C.

10. The process of claim 1 wherein the proportions of titanium to cobaltous cobalt to aluminum, expressed as their oxides, are defined in polygon ACEJI of FIGURE 1.

11. The process of claim 1 wherein the proportions of titanium to cobaltous cobalt to aluminum, expressed as their oxides, are defined in polygon ACEJK of FIGURE 1.

12. The process of claim 1 wherein the proportions of titanium to cobaltous cobalt to aluminum, expressed as their oxides, are defined in polygon ACDIM of FIGURE 1.

References Cited in the file of this patent

UNITED STATES PATENTS

| | | |
|---|---|---|
| Re. 21,427 | McKinney et al. | Apr. 16, 1940 |
| 2,087,917 | Nelson | June 22, 1937 |
| 2,224,987 | Raspe et al. | Dec. 17, 1940 |
| 2,766,133 | Marcot et al. | Oct. 9, 1956 |

FOREIGN PATENTS

| | | |
|---|---|---|
| 163,196 | Switzerland | July 31, 1933 |

OTHER REFERENCES

Titanox Pigments, published by Titanium Pigment Corporation, TP–20M–12–49, page 3, page 32, page 42.

McEachern: The Mining World, vol. 34, Jan. 14, 1911, page 72.

Natta et al.: Gazz. Chim et al., vol 59, pages 620–642 (1929) (Chem. Abstracts, vol. 24, page 564 (1936)).

UNITED STATES PATENT OFFICE
CERTIFICATE OF CORRECTION

Patent No. 3,079,269                       February 26, 1963

Roy W. Chrest et al.

It is hereby certified that error appears in the above numbered patent requiring correction and that the said Letters Patent should read as corrected below.

Column 2, line 9, for "phalocyanine" read -- phthalocyanine --; column 18, line 40, after "residue" insert -- of --.

Signed and sealed this 24th day of September 1963.

(SEAL)
Attest:

ERNEST W. SWIDER
Attesting Officer

DAVID L. LADD
Commissioner of Patents